US 11,320,263 B2

(12) United States Patent
Eidinger et al.

(10) Patent No.: US 11,320,263 B2
(45) Date of Patent: May 3, 2022

(54) LASER LEVEL SYSTEM

(71) Applicant: Stanley Black & Decker Inc., New Britain, CT (US)

(72) Inventors: Bruce Eidinger, Meriden, CT (US); Kun Chang, Suzhou (CN)

(73) Assignee: Stanley Black & Decker Inc., New Britain, CT (US)

( * ) Notice: Subject to any disclaimer, the term of this patent is extended or adjusted under 35 U.S.C. 154(b) by 201 days.

(21) Appl. No.: 16/726,360

(22) Filed: Dec. 24, 2019

(65) Prior Publication Data
US 2020/0240783 A1 Jul. 30, 2020

Related U.S. Application Data

(60) Provisional application No. 62/837,497, filed on Apr. 23, 2019, provisional application No. 62/796,945, filed on Jan. 25, 2019.

(51) Int. Cl.
*G01C 15/00* (2006.01)
*G01C 9/06* (2006.01)

(52) U.S. Cl.
CPC ............. *G01C 15/004* (2013.01); *G01C 9/06* (2013.01); *G01C 2009/066* (2013.01)

(58) Field of Classification Search
None
See application file for complete search history.

(56) References Cited

U.S. PATENT DOCUMENTS

| 4,907,879 | A | 3/1990 | Webb |
| 4,988,192 | A | 1/1991 | Knittel |
| 5,077,156 | A | 12/1991 | Finter et al. |
| 5,486,690 | A | 1/1996 | Ake |
| 5,551,159 | A | 9/1996 | Mooty |
| 5,680,208 | A | 10/1997 | Butler et al. |
| 5,687,486 | A | 11/1997 | Foltz |
| 5,903,345 | A | 5/1999 | Butler et al. |
| 5,921,733 | A | 7/1999 | Kaibach et al. |
| 6,082,875 | A | 7/2000 | Kousek |
| 6,209,210 | B1 | 4/2001 | Stout |

(Continued)

FOREIGN PATENT DOCUMENTS

CN 112414378 A * 2/2021
DE 10137751 A1 2/2003
(Continued)

OTHER PUBLICATIONS

EP EESR dated, Jun. 16, 2020 in corresponding EP application EP 20 15 3716.
(Continued)

*Primary Examiner* — Christopher W Fulton
(74) *Attorney, Agent, or Firm* — Stephen R. Valancius

(57) ABSTRACT

The present disclosure relates to a laser level system. The laser level system includes a mount, a laser secured to the mount and a remove input device. The mount includes a rotating portion to which the laser level is secured. The remote input device controls rotation of the rotating portion. The laser level is secured to the rotating portion of the mount such that when the rotating portion rotates, the laser level rotates concurrently along with the rotating portion of the mount.

20 Claims, 17 Drawing Sheets

(56) References Cited

U.S. PATENT DOCUMENTS

| | | | | |
|---|---|---|---|---|
| 6,314,651 B1 * | 11/2001 | Ohtomo | ............... | G01C 15/004 33/290 |
| 6,421,360 B1 | 7/2002 | Hilti | | |
| 6,427,347 B1 | 8/2002 | Butler, Sr. | | |
| 6,760,974 B1 | 7/2004 | Jorgenson | | |
| 6,763,595 B1 * | 7/2004 | Hersey | ................. | G01C 15/004 33/286 |
| 6,763,596 B1 * | 7/2004 | Puri | ..................... | G01C 15/002 33/227 |
| 6,922,901 B1 | 8/2005 | Chou et al. | | |
| 7,065,890 B1 | 6/2006 | Chang | | |
| 7,116,697 B1 | 10/2006 | Dong | | |
| 7,119,316 B2 | 10/2006 | Green et al. | | |
| 7,152,334 B2 | 12/2006 | Gamal et al. | | |
| 7,372,011 B2 | 5/2008 | Green et al. | | |
| 7,373,725 B1 | 5/2008 | Vanneman et al. | | |
| 7,506,452 B1 | 3/2009 | Vanneman et al. | | |
| 7,724,352 B2 | 5/2010 | Essling | | |
| 8,201,340 B2 | 6/2012 | Steffensen | | |
| 8,269,612 B2 | 9/2012 | Horky et al. | | |
| 8,319,950 B2 | 11/2012 | Snyder | | |
| 8,482,721 B2 | 7/2013 | Snyder | | |
| 8,511,635 B2 | 8/2013 | Steffen | | |
| 8,668,182 B2 | 3/2014 | Steffen et al. | | |
| 8,711,369 B2 | 4/2014 | Campagna | | |
| 8,857,068 B2 * | 10/2014 | Kodaira | ............... | G01C 15/004 33/290 |
| 8,875,408 B2 | 11/2014 | Steffensen | | |
| 9,188,441 B2 | 11/2015 | Munroe et al. | | |
| 9,207,077 B2 | 12/2015 | Kehl et al. | | |
| 9,222,772 B2 | 12/2015 | Munroe et al. | | |
| 9,273,958 B2 | 3/2016 | Gros et al. | | |
| 9,360,317 B2 | 6/2016 | Munroe et al. | | |
| 9,441,963 B2 | 9/2016 | Yuen et al. | | |
| 9,494,407 B2 | 11/2016 | Haney et al. | | |
| 9,759,559 B2 | 9/2017 | Haney et al. | | |
| 9,839,076 B2 | 12/2017 | Metz et al. | | |
| 9,939,265 B2 | 4/2018 | Schmidt et al. | | |
| 10,564,033 B2 | 2/2020 | Lukic et al. | | |
| 10,677,592 B2 | 6/2020 | Lukic | | |
| 10,684,129 B2 | 6/2020 | Lukic et al. | | |
| 10,697,796 B2 | 6/2020 | Lukic et al. | | |
| 2001/0025425 A1 * | 10/2001 | Haijima | ................ | G01C 15/004 33/281 |
| 2002/0060788 A1 | 5/2002 | Ohtomo | | |
| 2007/0089309 A1 * | 4/2007 | Kodaira | ................... | G01S 7/481 33/290 |
| 2009/0193671 A1 * | 8/2009 | Sergyeyenko | ......... | G01C 15/02 33/290 |
| 2010/0064534 A1 * | 3/2010 | Schumacher | ........ | G01C 15/004 33/228 |
| 2013/0000133 A1 | 1/2013 | Kodaira | | |
| 2013/0016297 A1 | 1/2013 | Nakamura | | |
| 2013/0276315 A1 * | 10/2013 | Kahle | ................... | G01C 15/006 33/228 |
| 2014/0190025 A1 * | 7/2014 | Giger | ................... | G01C 15/002 33/228 |
| 2014/0283399 A1 * | 9/2014 | Fessler | ................... | G01C 15/004 33/291 |
| 2014/0304994 A1 * | 10/2014 | Dumoulin | ............ | G02B 27/648 33/228 |
| 2015/0160009 A1 * | 6/2015 | Bank | ................... | G01C 15/002 33/228 |
| 2015/0308825 A1 | 10/2015 | Dumoulin et al. | | |
| 2016/0202056 A1 | 7/2016 | Senger | | |
| 2016/0290801 A1 | 10/2016 | Horkey | | |
| 2017/0219710 A1 | 8/2017 | Schmidt et al. | | |
| 2017/0234477 A1 | 8/2017 | Siegler et al. | | |
| 2018/0335316 A1 | 11/2018 | Lukic | | |
| 2018/0335349 A1 | 11/2018 | Lukic | | |
| 2019/0154443 A1 | 5/2019 | Winter | | |
| 2019/0154444 A1 | 5/2019 | Lukic | | |
| 2019/0154445 A1 | 5/2019 | Lukic | | |

FOREIGN PATENT DOCUMENTS

| | | | | |
|---|---|---|---|---|
| DE | 102007000280 A1 | 11/2008 | | |
| DE | 102009000590 A1 | 8/2010 | | |
| DE | 102009054702 A1 | 6/2011 | | |
| EP | 1108981 A2 | 6/2001 | | |
| EP | 1203930 A2 * | 5/2002 | ........... | G01C 15/004 |
| EP | 2400263 B1 | 1/2016 | | |
| JP | 03237320 A2 | 10/1991 | | |
| KR | 200900059949 A | 6/2009 | | |
| WO | 9617222 A1 | 6/1996 | | |
| WO | 17093085 A1 | 6/2017 | | |
| WO | 17093086 A1 | 6/2017 | | |
| WO | 17093087 A1 | 6/2017 | | |
| WO | 17093088 A1 | 6/2017 | | |
| WO | 17093089 A1 | 6/2017 | | |
| WO | 17093091 A1 | 6/2017 | | |
| WO | 18001802 A1 | 1/2018 | | |
| WO | 18001803 A1 | 1/2018 | | |
| WO | 18001804 A1 | 1/2018 | | |
| WO | 18114306 A1 | 6/2018 | | |

OTHER PUBLICATIONS

Prior Art Stanley FMHT1-77435 FatMax Magnetic Stand—https://www.amazon.co.uk/Stanley-FMHT1-77435-FatMax-Magnetic-Stand-Levels/dp/B06XCNT5MB—website accessed_Apr. 16, 2020.

Prior Art DEWALT DW0779LR laser level and detector—https://www.dewalt.com/products/hand-tools/measuring-and-layout-tools/self-leveling-rotary-lasers/20v-max-red-rotary-tough-laser/dw079lr website accessed _Sep. 24, 2020.

Prior art DEWALT DW079LG laser level and detector—https://www.dewalt.com/products/hand-tools/measuring-and-layout-tools/self-leveling-rotary-lasers/20v-max-green-rotary-tough-laser/dw079lg website accessed _Sep. 24, 2020.

Prior art Stanley FatMax FMHT77652 receiver—http://service.blackanddecker.fr/bd/fr/en-GB/Product/ProductDetail?id=14930 website accessed _Sep. 24, 2020.

Prior art Stanley FatMax FMHT77653 receiver—http://service.blackanddecker.fr/bd/fr/en-GB/Product/ProductDetail?id=14931 website accessed _Sep. 24, 2020.

Prior art LEVELFIX DLD100 receiver—https://www.etra.fi/en/laser-vastaanotin-dld100r-10480025335 website accessed _Sep. 24, 2020.

Prior art HILTI PR 30-HVS A12—https://www.hilti.eom/c/CLS_MEA_TOOL_INSERT_7127/CLS_ROTATING_LASERS_7127/r5952923 website accessed _Sep. 24, 2020.

Prior art HILTI PR 300 HV2S—https://www.hilti.com/c/CLS_MEA_TOOL_INSERT_7127/CLS_ROTATING_LASERS_7127/r4185761 website accessed _Sep. 24, 2020.

LeicaRodEye160Manual—2013.

* cited by examiner

LASER LEVEL SYSTEM

CROSS-REFERENCE TO RELATED APPLICATION

This application claims priority and benefit to U.S. Provisional Application No. 62/796,945, filed on Jan. 25, 2019, claims priority and to U.S. Provisional Application No. 62/837,497, filed on Apr. 23, 2019, both titled "LASER LEVEL SYSTEM". The entire contents of each are hereby incorporated herein by reference in their entirety.

BACKGROUND OF THE INVENTION

1. Field of the Invention

The present disclosure relates to a laser level system.

2. Description of Related Art

Laser level systems are well known. Laser levels may be attached to mounting brackets so as to orient the level in a predetermined position relative to an object to which the mounting bracket is mounted.

SUMMARY OF EMBODIMENTS OF THE INVENTION

One aspect of the present disclosure relates to a laser level system. According to one aspect there is an exemplary embodiment of a laser level system that includes a mount, a laser level secured to the mount and a remote input device. The mount includes a rotating portion to which the laser level is secured. The remote input device is configured to control rotation of the rotating portion. The laser level is secured to the rotating portion of the mount such that when the rotating portion rotates, the laser level rotates concurrently along with the rotating portion of the mount.

The mount may further include a motor which effects the rotation of the rotating portion.

The mount may further include a wireless receiver which is configured to receive a signal from the remote input device.

The mount may further include a base and an attachment portion, the attachment portion being transverse to the base.

The attachment portion may include attachment elements configured to connect to a workpiece.

The attachment elements may include magnets.

The rotating portion of the mount may be disposed on the base of the mount.

The motor may be disposed in the base.

The laser level may be a cross-line laser level.

The laser level system may further include a manual adjustment actuator, which is configured to allow a user to manually rotate the rotating portion of the mount.

The mount may include comprising a base and an attachment portion, the base being generally transverse to the attachment portion.

According to another aspect, there is an exemplary embodiment of a laser level system. The laser level system includes a laser level, a mount and a remote input device. The laser level system may be secured to the base of the mount, the laser level including a housing and at least one laser generator housed in the housing, the laser generator configured to project a laser beam outside of the housing. The base may include a rotating portion which rotates relative to the rest of the base portion and the attachment portion. The remote input device may be configured to control rotation of the rotating portion.

The laser level may be secured to the rotating portion of the mount such that when the rotating portion rotates, the laser level rotates concurrently along with the rotating portion of the mount.

The mount may further include a motor which effects the rotation of the rotating portion.

The mount may further include a wireless receiver which is configured to receive a signal from the remote input device.

The mount may further include a base and an attachment portion, the attachment portion being transverse to the base.

The attachment portion may include attachment elements configured to connect to a workpiece.

The laser level system may further include an output shaft connected to and driven by the motor.

The laser level system may further include a first gear connected to and rotatable with the output shaft.

The laser level system may further include a second gear engaged with the first great and configured to rotate with the first gear.

The laser level system may further include a driving shaft, the driving shaft holding the second gear and configured to rotate with the second gear.

There may be third gear on the driving shaft, the third gear operatively connected with the rotating portion to translate the motion of the motor to drive the rotating portion of the mount.

According to another aspect, there is an exemplary embodiment of a laser level system, the system including a mount, a laser level secured to the base of the mount, and a remote input device. The laser level includes a housing and at least one laser generator housed in the housing, the laser generator configured to project a laser beam outside of the housing.

The mount includes a movable portion and a stationary portion, the movable portion being movable relative to the stationary portion.

The mount further comprises a motor configured to selectively drive the movable portion so as to move the movable portion relative to the stationary portion.

The remote input device may include a wireless transmitter.

The mount may include a wireless receiver.

The remote input device may be configured to, in response to a user input, send a wireless signal to the mount in order to actuate the motor to move the movable portion.

The mount may further include at least one gear disposed operatively between the motor and the movable portion, the at least one gear transferring motion from the motor to the movable portion.

The laser may be a cross-line laser level.

The mount may further include a controller.

According to another aspect there is an exemplary embodiment of a laser level system that includes a laser level and a remote input device. The laser level includes a housing and at least one laser generator configured to project a beam outside of the housing onto a surface such as a wall. The laser level further includes a motor housed in the housing, the motor is configured to selectively move output of the laser beam in response to a signal from the remote input device.

The laser level may include a wireless transceiver or a wireless receiver which is configured to receive the signal from the remote input device.

The remote input device may be configured to provide a signal to move a laser beam a particular distance or rotate it about a certain angle. For example, the input device may provide a signal to rotate the laser beam 5 degrees, 10 degrees, 15 degrees, or throughout that range. The remote input device may also provide a signal to move the laser beam 5 mm, 10 mm, 15 mm or various distances throughout that range.

The laser level may be a cross-line laser level.

The laser level may include one or more dot projections.

According to another aspect, there is an exemplary embodiment of a method of determining alignment of a laser level system. The method includes mounting a laser level on a mount, projecting a laser line from the laser level, detecting the laser line with a remote detector, rotating the laser level relative to the mount while keeping the remote detector stationary and determining whether the laser line moves relative to the remote detector as the laser level rotates.

The method may further include indicating that the laser line has moved relative to the remote detector more than a threshold amount.

The laser line may be a substantially horizontal laser line.

The method may further include determining whether the laser line moves relative to the remote detector as the laser level rotates comprises determining whether the laser line moves vertically relative to the remote detector.

The remote detector may further include a photo diode.

The remote detector may further include a window which allows the laser line to project onto the photo diode when the laser line is aligned with the window.

The remote detector may further serve as a remote control device which is configured to control at least one operation of the laser level or the mount.

The remote detector may be configured to control rotation of the laser level relative to the mount.

The remote detector may include a display.

The remote detector may include a controller and a transceiver.

According to another aspect, there is an exemplary embodiment of a method of determining alignment of a laser level, the method including projecting a substantially horizontal laser line from the laser level, detecting the laser line with a remote detector, rotating the laser line while keeping the remote detector stationary and determining a change in a vertical positioning of the laser line relative to the remote detector as the laser line rotates.

The method may further include indicating whether the vertical position has changed more than a threshold amount.

The remote detector may further include a photo diode.

The remote detector may further include a window which allows the laser line to project onto the photo diode when the laser line is aligned with the window.

The remote detector may further serve as a remote control device which is configured to control at least one operation of the laser level or the mount.

The remote detector may be configured to control rotation of the laser level relative to the mount.

The remote detector may include a controller.

According to another aspect, there is an exemplary embodiment of a laser level system, the system includes a mount. A laser level is rotatably secured to the mount and projects a laser line. The system further includes a remote detector. The remote detector includes a photo detector configured to detect the laser line. The remote detector is configured to determine a misalignment of the laser line.

The remote detector may be configured to control rotation of the laser level relative to the mount.

The laser level may include a controller and a transceiver.

The laser level may include an accelerometer.

The accelerometer may determine whether the laser level is in a self-leveling range.

The laser level may transmit to the remote detector the determination of whether the laser level is in a self leveling range.

The laser level may rotate relative to the mount about a rotational axis.

The laser level may include a motor and a battery pack.

The motor may drive a gear.

The gear may contact complementary gearing on the mount and cause the laser level to rotate relative to the mount.

The laser level may include a power tool battery pack which powers the motor.

These and other aspects of various embodiments of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. In one embodiment of the invention, the structural components illustrated herein are drawn to scale. It is to be expressly understood, however, that the drawings are for the purpose of illustration and description only and are not intended as a definition of the limits of the invention. In addition, it should be appreciated that structural features shown or described in any one embodiment herein can be used in other embodiments as well. As used in the specification and in the claims, the singular form of "a", "an", and "the" include plural referents unless the context clearly dictates otherwise.

All closed-ended (e.g., between A and B) and open-ended (greater than C) ranges of values disclosed herein explicitly include all ranges that fall within or nest within such ranges. For example, a disclosed range of 1-10 is understood as also disclosing, among other ranged, 2-10, 1-9, 3-9, etc.

BRIEF DESCRIPTION OF THE DRAWINGS

For a better understanding of embodiments of the present invention as well as other objects and further features thereof, reference is made to the following description which is to be used in conjunction with the accompanying drawings, where.

DETAILED DESCRIPTION OF EXEMPLARY EMBODIMENTS OF THE INVENTION

Figure 1:
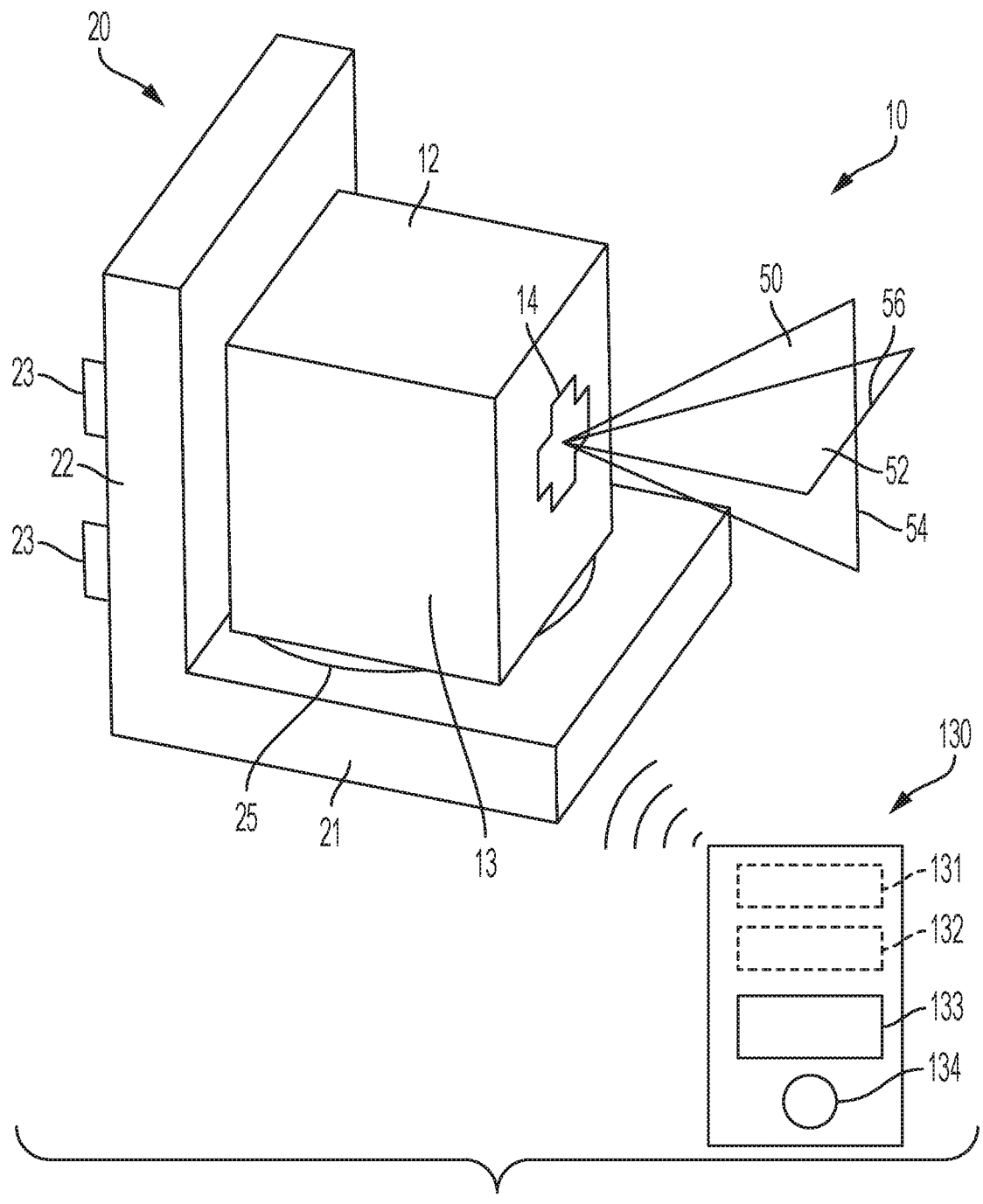
FIG. 1 is a perspective view of an exemplary embodiment of a laser level system.

FIG. 1 illustrates a laser level system 10. Laser level system 10 includes a laser level 12, a laser mount 20 and a remote input device 130. The remote input device 130 may be a dedicated remote control or may be a computing device such as a personal computer, smartphone or tablet. The remote input device 130 has an internal transceiver 131 which is capable of sending and receiving wireless signals. The remote input device 130 may also include a controller, such as a microprocessor 132. The remote input device 130 may also include a display 133 which may display images or indicators.

The remote input device 130 may transmit the wireless signal by any of a variety of means, including via a Bluetooth® protocol, Wi-Fi, an infrared signal or other known means.

Figure 2:
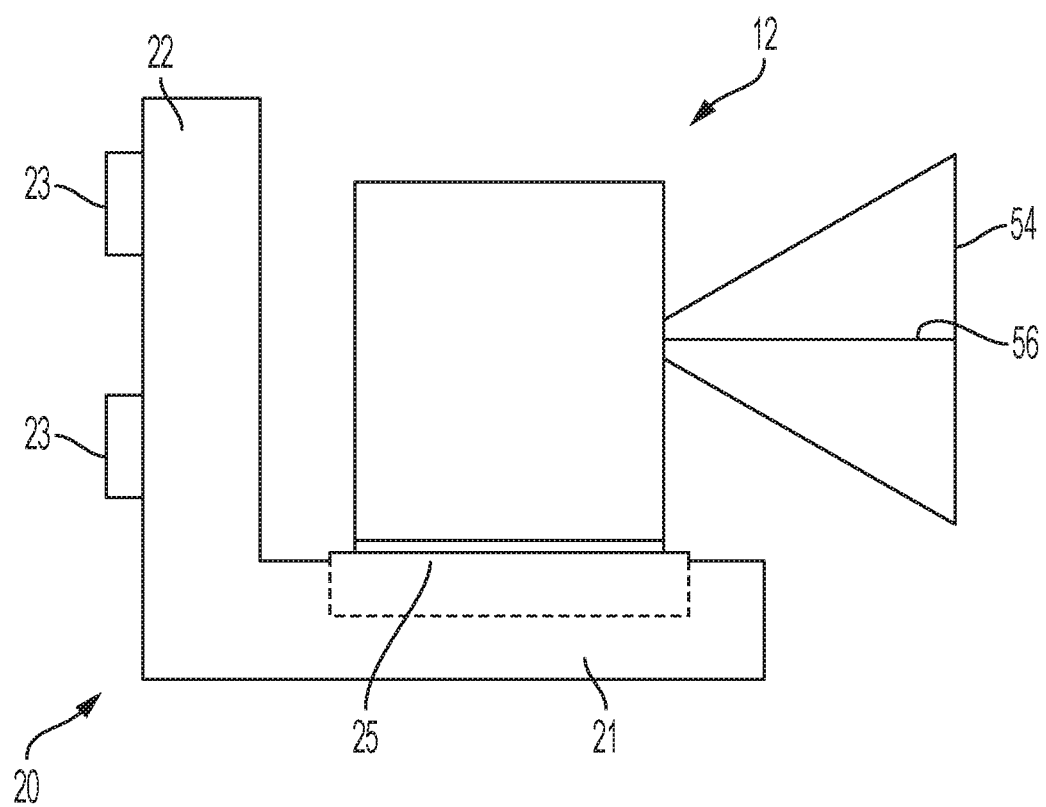
FIG. 2 is a side view of the laser level and mount according to the exemplary embodiment of the laser level system.

As shown in FIGS. 1 and 2, the mount 20 includes a base portion 21 and an attachment portion 22. The attachment portion 22 is generally transverse to the base portion 21. The attachment portion 22 includes a pair of magnets 23. The magnets 23 are attracted to various metal surfaces and when they contact such a surface hold the mount 20 in place. For example, the magnets 23 may be secured to a metal door hinge or a metal cabinet to secure the mount to the door hinge or cabinet, as the case may be. In other exemplary embodiments, the attachment portion 22 may include other attachment features instead of or in addition to magnets. For example, the attachment portion 22 may include straps for securing the mount 20 to a pole.

As also shown in FIGS. 1 and 2, the base portion 21 includes a rotating portion 25. The rotating portion 25 of the exemplary embodiment is cylindrical and the laser level 12 is mounted to the rotating portion 25. The rotating portion 25 rotates about a central axis relative to the remainder of the mount 20. This allows the laser level 12 to rotate and the beams projected by the laser level 12 to rotate and shine on different surfaces or different parts of a surface.

As shown in FIGS. 1 and 2, the laser level 12 is a cross-line laser level. The cross-line laser level 12 includes a housing 13 and a window 14. Internal to the housing 13, the laser level 12 includes a pair of laser generators, which may be laser diodes. The laser diodes project orthogonal beams 50, 52 which may project orthogonal lines 54, 56 on a surface such as a wall. The laser level 12 may operate similarly to that shown in U.S. Patent Application Publication No. 2014/0352161, which is hereby incorporated by reference in its entirety.

Figure 3:
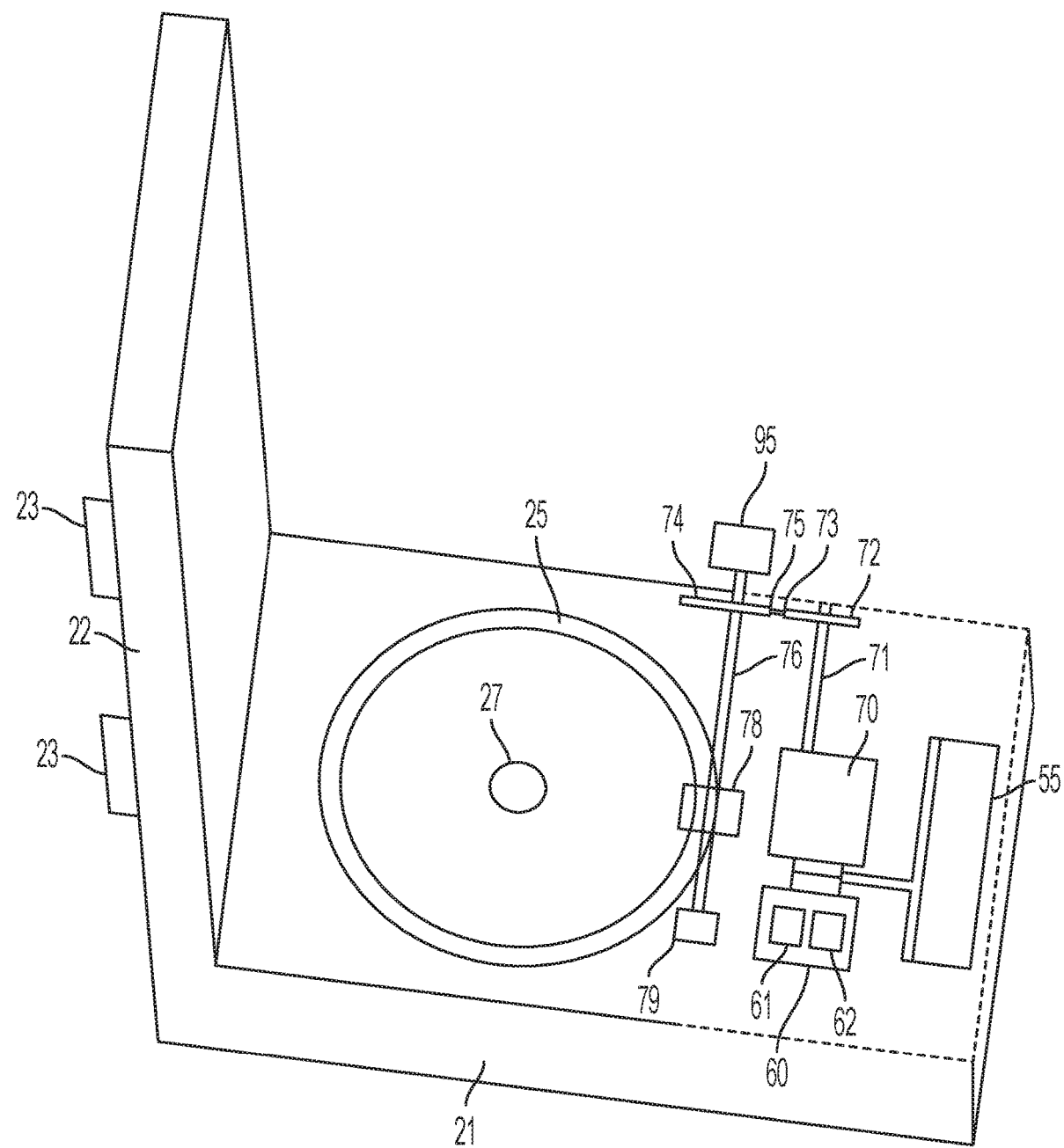
FIG. 3 is a perspective view of the mount of the exemplary embodiment of the laser level system with housing portions partially removed to illustrate internal mechanisms.

A top perspective view of the base portion 21 of the mount 20 is shown in FIG. 3. A portion of the top of the base portion 21 is shown removed (indicated by dashed lines) so that internal components can be illustrated.

As shown in FIG. 3, the rotating portion 25 is generally cylindrical. It includes a threaded connector 27 at its center. The threaded connector 27 may be connected to a complementary threaded connector on a bottom portion of the housing 13 of the laser level 12 in order to secure the laser level 12 to the rotating portion 25 of the base portion 21. In other embodiments the laser level 12 can be connected to the rotating portion 25 by other means. For example, the laser level 12 may simply be placed on the rotating portion 25. In other embodiments, the laser level 12 could be snapped on the rotating portion 25 (one or both of the laser level 12 and the rotating portion 25 would contain complementary snapping portions).

As shown in FIG. 3, the base portion 21 houses a battery 55. The battery is connected to and provides power to printed circuit board 60 and motor 70. The printed circuit board 60 may include a controller, such as a microprocessor 61, and may also include a wireless transceiver 62 which serves as both a wireless receiver and wireless transmitter. In other embodiments, there may be only be a receiver or transmitter instead of a transceiver. In some embodiments, there may also be a separate memory. The microprocessor 61 may include a memory itself.

In use, a signal from the remote controlling device 30 may be received by the transceiver 62. In accordance with the received signal, the microprocessor 61 can control a flow of electricity from the battery 55 to the motor 70 in order to drive the motor 70. The motor 70 has an output shaft 71 and there is a gear 72 at an end of the output shaft 71. The gear 72 is cylindrical and has gear teeth 73 on its circumference. The gear 72 meshes with another gear 74 with gear teeth 75 to transfer motion from the gear 72 to the gear 74. Gear 74 is connected to a shaft 76 and the shaft 76 rotates as the gear 74 rotates. The shaft is supported at a far end by a bearing 77 and another gear 78 is disposed on the shaft 76 between the bearing 77 and the gear 74. Gear 78 includes gear teeth 79, which mesh with teeth 80 on a bottom surface of the rotating portion 25 so as to drive rotation of the rotating portion 25. In this manner, rotation of the rotating portion 25 can be effected by the remote input device 130. The battery 55, printed circuit board 60, microprocessor 61, wireless transceiver 62, motor 70, shaft 71, gear 72 with gear teeth 73, gear 74 with gear teeth 75, shaft 76, gear 78 and bearing 79 are housed internally in the base portion 21 of the mount 20. The remote input device 130 can send a signal for clockwise or counter-clockwise rotation. The microprocessor 61 then controls rotation of the motor in the appropriate direction to rotate the rotating portion 25 in the appropriate direction. Particular inputs for speed of rotation or distance of rotation may also be input into the remote input device 130. In a similar manner, the transceiver 131 transmits the appropriate signal, the signal is received by the transceiver 62, and the microprocessor 61 controls the motor 70 and battery 55 in the manner prescribed by the signal of the remote input device 130.

Various types of appropriate gears may be used to transfer the motion. For example, the gear 78 could be a bevel gear and teeth 80 could serve as corresponding bevel gear teeth on the rotation portion. Elements 78 and 80 could also be formed as miter gears or worm gears, with the gear teeth being formed appropriately to transfer motion from the gear 78 to the rotating portion 25.

Gears 72 and 74 may, for example, be spur gears.

A user may input commands into the remote input device 130 through the display 133, which may be a touch screen. The user may also use one or more buttons 134. For example, the user may input a command through the remote input device 130 to rotate the rotating portion 25 of the mount 20 5 degrees counter-clockwise. The user may input a command to rotate the rotating portion at a speed of 5 degrees per second in the counter-clockwise direction. Any of a variety of different speeds, angles and directions may be input.

As additionally shown in FIG. 3, the mount 20 may include a manual adjust dial 95. The manual adjust dial 95 is connected to the shaft 76 and may be manually turned to turn the shaft 76, and thus the rotating portion. The manual adjust dial 95 is outside the housing of the mount 20 so as to be accessible to the user.

Figure 4:
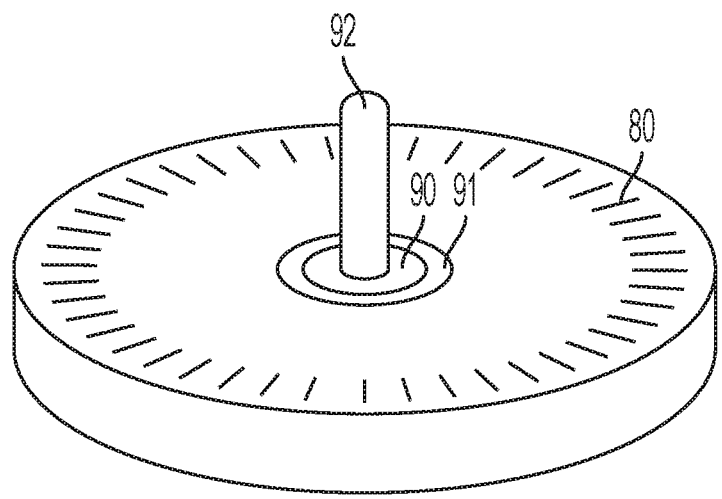
FIG. 4 is a bottom perspective view of a rotating portion of the mount of the exemplary embodiment.

FIG. 4. is a bottom perspective view of the rotating portion 25. The teeth 80 discussed above, which mesh with the gear teeth 79 to drive rotation of the rotating portion 25 are shown. As additionally seen in FIG. 4, the rotating portion 25 has a bearing pot 91 which holds a bearing 90, and there is a shaft 92. The shaft 92 is connected to the housing portion of the base 21. The rotating portion 25 can rotate relative to the bearing 90 which is held stationary by the shaft 92.

In other embodiments, there may be a transmission connected to the motor 70 in order to slow down or speed up the output from the motor 70. Additionally, the battery 55 may be placed in different locations. Furthermore, other types of laser levels may be used than a cross-line laser level. For example, a three line laser level may be used such as that shown in U.S. Patent Application Publication No. 2018/0321035, which is hereby incorporated by reference, in its entirety.

Figure 5:
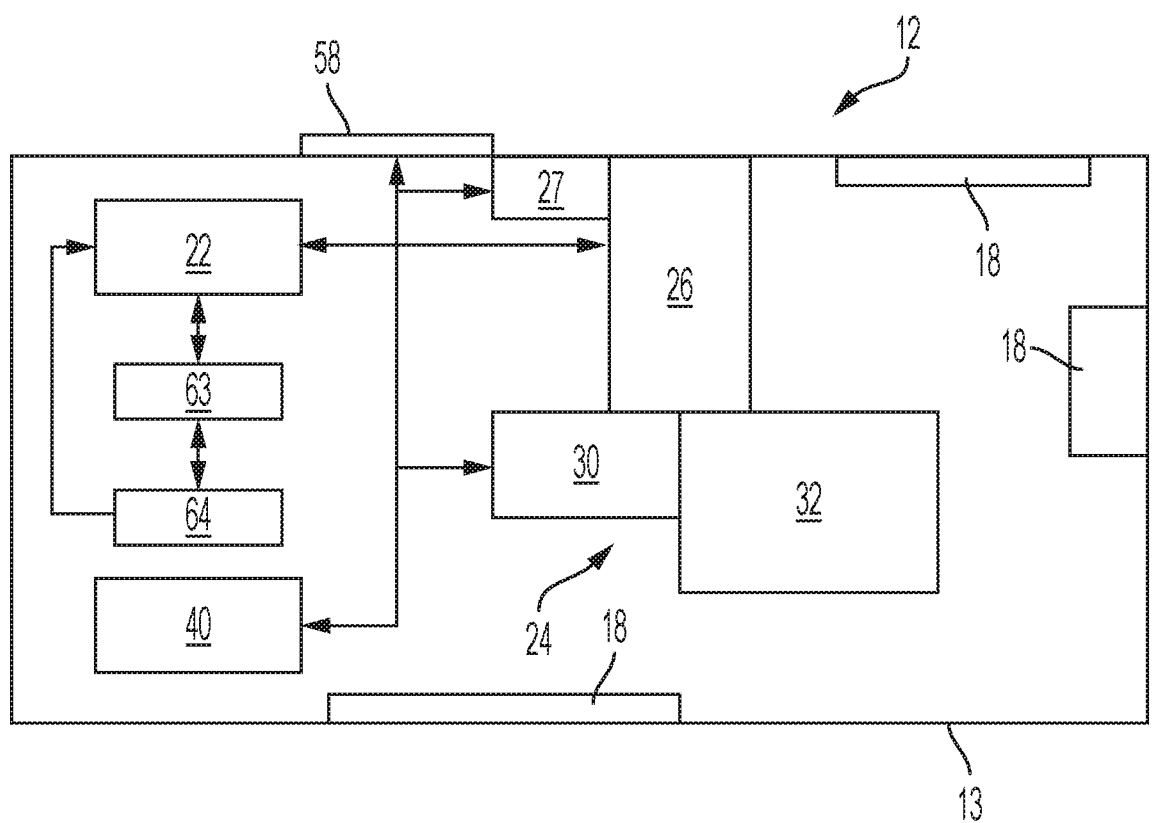
FIG. 5 is a schematic view of the exemplary embodiment of a laser level.
Figure 6:
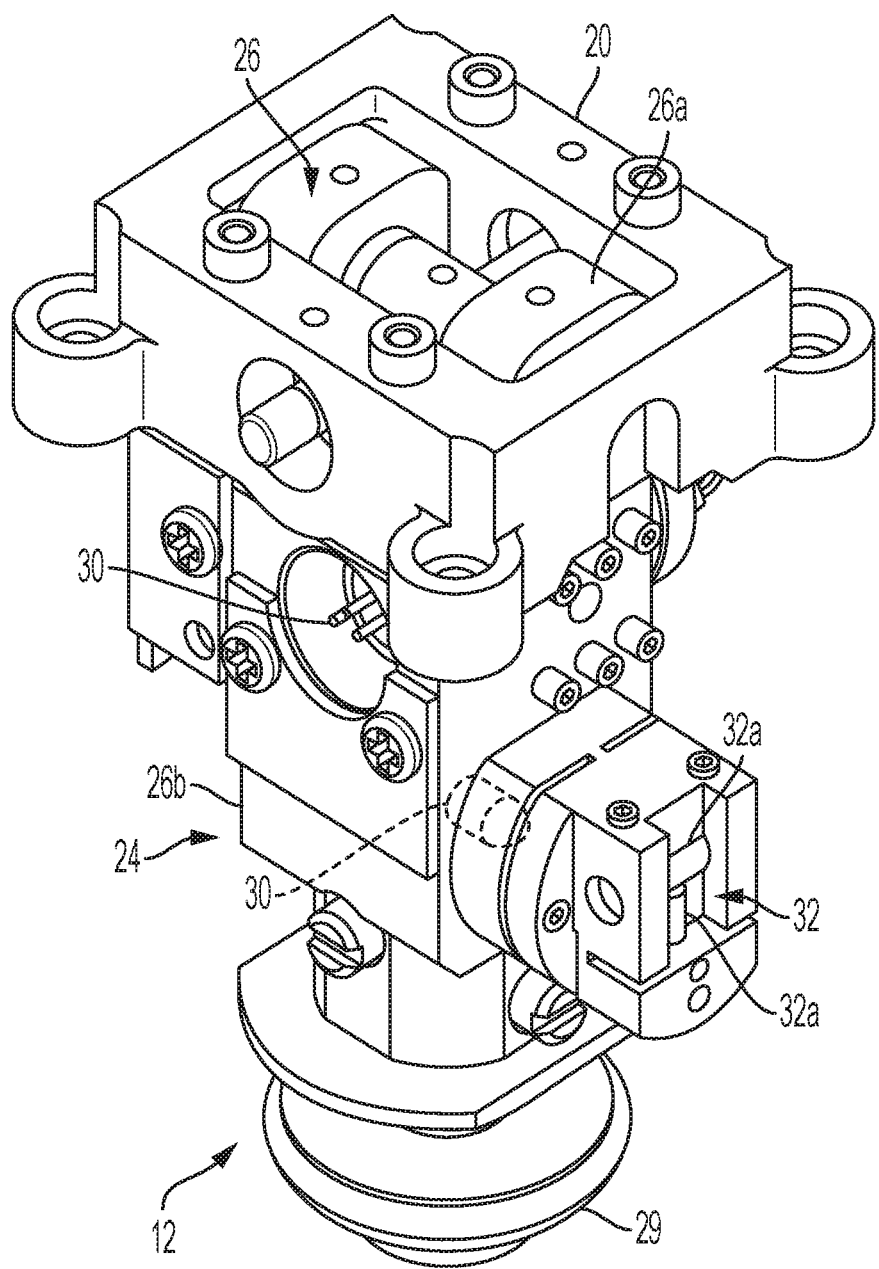
FIG. 6 is a perspective view of the internals of the laser level according to the exemplary embodiment.

FIGS. 5 and 6 illustrate the laser level 12 with internals and schematically. As shown in FIG. 5, the laser level 12 includes a laser projection device 24, a self-leveling mechanism 26, controller 22, a housing 13 a power source 40, and/or other components. The laser level 12 may also include an accelerometer 63 and wireless transceiver 64, each of which are connected to the controller 22. The accelerometer 63 can measure the distance that the laser level 12 rotates. That can be useful when a user inputs a command to rotate 5 degrees. The motor 60 itself may be made to move sufficient to produce a 5 degree movement and the accelerometer 63 may check this movement to ensure 5 degrees is actually achieved. If the accelerometer 63 information indicates that the 5 degrees has not been achieved, this can be relayed to the remote input device 130, and the remote input device 130 can provide a signal to actuate the motor necessary to correct the rotation. Information from the accelerometer may also be shared with the remote input device 130 to be displayed on the display 133 of the device 130.

Laser projection device 24 is configured to generate and/or project a laser beam outwardly from housing 20. Laser projection device 24 includes one or more laser generators 30 such as laser diodes, one or more optical components 32 (e.g., lens(es) and/or mirror(s)), and/or other components.

Laser generator 30 (e.g., laser diode(s)) is configured to emit a laser beam. In some embodiments, laser projection device 24 includes a single laser diode 30. In some embodiments, laser projection device 24 includes two or more laser diodes. Laser generator 30 may produce visible light having a predetermined wavelength (e.g., in the range of 400-700 nm). Laser generator 30 may produce a red laser beam, a green laser beam, and/or laser beams of other colors and/or wavelengths. In some embodiments, laser generator 30 may have a predetermined output power and/or input voltage. For example, the output power may be between about 0.5 and 20 mW. The input voltage may be between about 2.7 volts and about 7.0 volts.

In some embodiments, the laser beam(s) projected out of housing 20 comprise one or more point-source beams that generate points on the objects they hit. Such point-source beams may be oriented orthogonally to each other (e.g., beam(s) projecting in any of four orthogonal horizontal directions, a beam projecting vertically upwardly, and/or a beam projecting vertically downwardly).

In some embodiments, the laser beam(s) are converted into fan beams (e.g., planar beams/light planes) via optical components 32 so as to project light lines onto the objects they intersect. Optical components 32 may include lenses, collimators (e.g., collimating lenses, collimating tube), apertures, and/or other optical components. Optical components 32 may include cylindrical lenses 32a and/or non-cylindrical lenses. In some embodiments, for example as shown in FIG. 1, one or more optical components 32 may include orthogonally oriented rod/cylinder lenses 32a that convert a point-source (i.e., linear) beam from a single diode 30 into two orthogonal planar (e.g., fan-shaped) beams that project a cross shape (e.g., a "+" shape) onto an object such as a wall. The point-source beam from the diode 30 is collimated and then generally directed to an intersection between the two cylinder lenses 32a, without previously being split. The portions of the point-source/linear beam that impinge upon the respective lenses 32a are converted into respective orthogonal fan-shaped planar beams 50, 52, as shown in FIG. 1. Alternatively, discrete laser generators 30 may be used for each planar beam (e.g., as shown in U.S. Pat. No. 6,763,595, the contents of which are hereby incorporated herein by reference). The output beams may comprise two, three, or more orthogonal planar beams. Such point-source and planar beam generating laser levels are well known in the art (e.g., as shown in U.S. Pat. Nos. 6,763,595; 6,763,596; 5,539,990; which are herein incorporated by reference, in their entirety).

Figure 7:
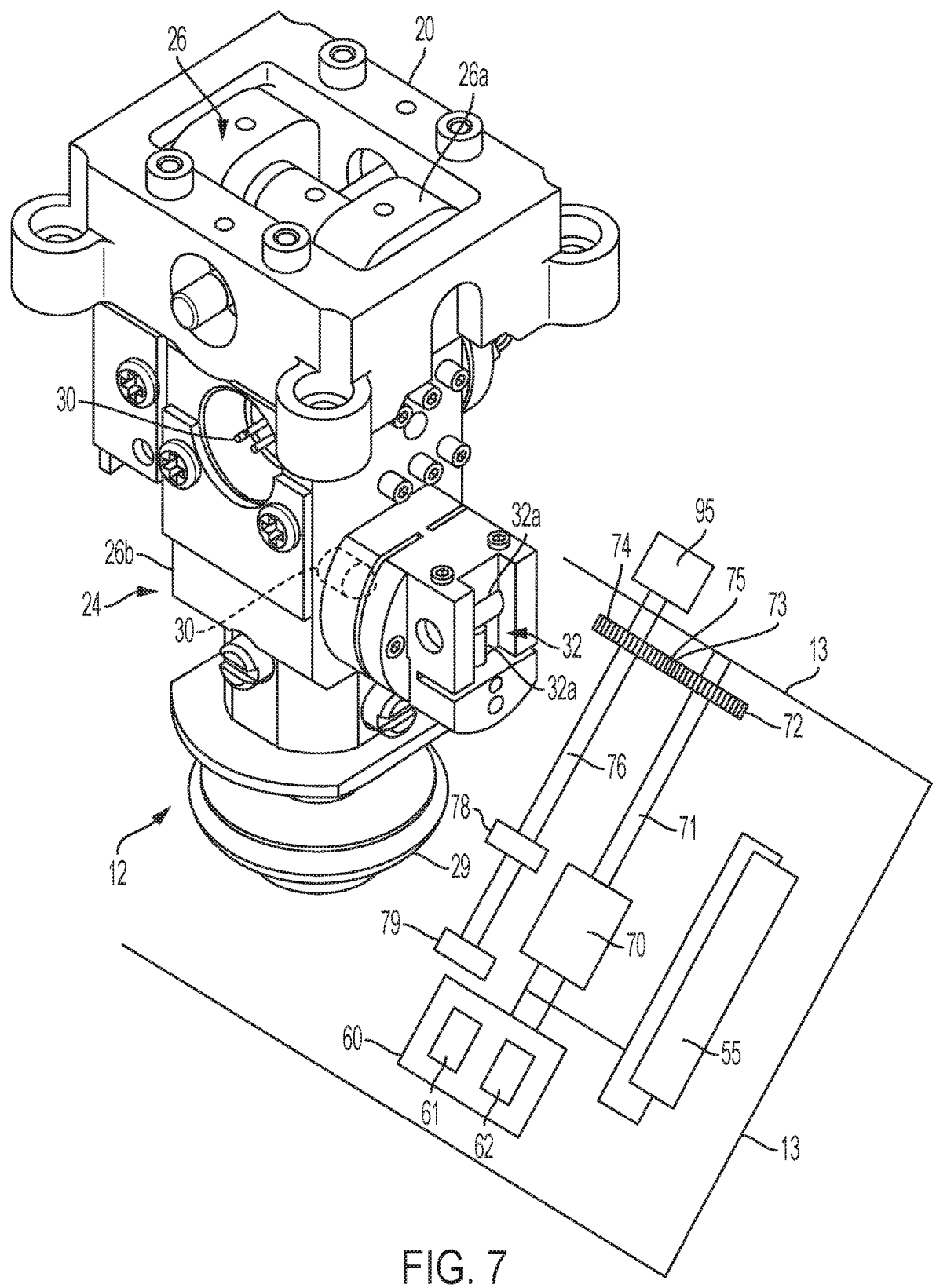
FIG. 7 is a perspective view of the internals of the laser level according to another exemplary embodiment where the motor driving device is located internally to the laser level housing.

Self-leveling mechanism 26 is supported by housing 13 and configured to orient the laser beam(s) in a predetermined direction relative to gravity. Self-leveling mechanism 26 may comprise any suitable self-leveling mechanism known in the art (e.g., a pendulum 26b that pendulously supports the laser generator(s) 30 (e.g., laser diode(s)) and/or one or more of the optical components 32, a motorized self-leveling mechanism that senses levelness and responsively tilts a portion of the level). In the embodiment illustrated in FIG. 7, self-leveling mechanism 26 comprises a pendulum 26b that is mounted to housing 13 and supports laser projection device 24 (including laser generator(s) 30 and optical components 32) so as to pendulously support laser projection device 24 from housing 13. As shown in FIG. 6, self-leveling mechanism 26 may suspend the pendulum 26b (including components of laser projection device 24 supported by the pendulum 26*b*) from housing 13 by a gimbal 26*a* and/or other pendulous connection that extends between the housing 13 and pendulum 26*b*. In some embodiments, for example as shown in FIG. 7, the pendulum 26*b* holds laser generator(s) 30, at least one of one or more optical components 32, and/or other components. Self-leveling mechanism 26 is configured to orient laser generator(s) 30 and/or one or more optical components 32 such that the one or more laser light planes are projected at predetermined angles relative to gravity (e.g., horizontally and vertically). Housing 13 is configured to contain laser projection device 24 and self-leveling mechanism 26 such that at least a portion of laser projection device 24 moves pendulously within housing 13 responsive to housing 13 being tilted by a user. In some embodiments, self-leveling mechanism 26 may include a magnetic damper 29. Such self-leveling mechanisms are well-known in the art (e.g., as shown in U.S. Pat. Nos. 6,763,595; 6,763,596; 5,539,990).

By way of a non-limiting example, FIG. 1 illustrates laser level 12 projecting two substantially perpendicular laser light planes 50, 52. Projected laser light planes 50 and 52 form illuminated lines 54 and 56 on a target surface (e.g., a nearby wall).

In another exemplary embodiment, the motor 70 and gearing components may be internal to or integrated with the laser level 12, rather than be part of the mount. In that instance, the mount would not include the rotating portion 25. Rather, it would have a stationary base. It may still include the threaded connector 27 so that the laser level 12 can connect to the mount. FIG. 7 illustrates this exemplary embodiment. Like parts are numbered and operate similarly to the above.

FIG. 7 illustrates a motor and gear system in the housing 13 of the laser level 12. The housing 13 is shown only in parts. As shown, the shafts 76 and 71 are supported in ends of the housing 13. The remaining components that were housed in the base 21 in the previous embodiment are likewise housed in the laser level housing 13. The gear 78 is configured to engage a surface of the magnetic damper 29. The magnetic damper 29 may be provided with teeth 80 such that the gear 78 can rotationally drive the laser level assembly through the magnetic damper 29. In other instances, the gear 78 may instead be a frictional member, such as a rubber ring. The frictional member can engage the magnetic damper which may, or may not, have a corresponding frictional member. The frictional member on the shaft 76 in place of gear 78 can then drive the rotational motion of the laser level components so as to rotate at least one of the laser beams.

Figure 8:
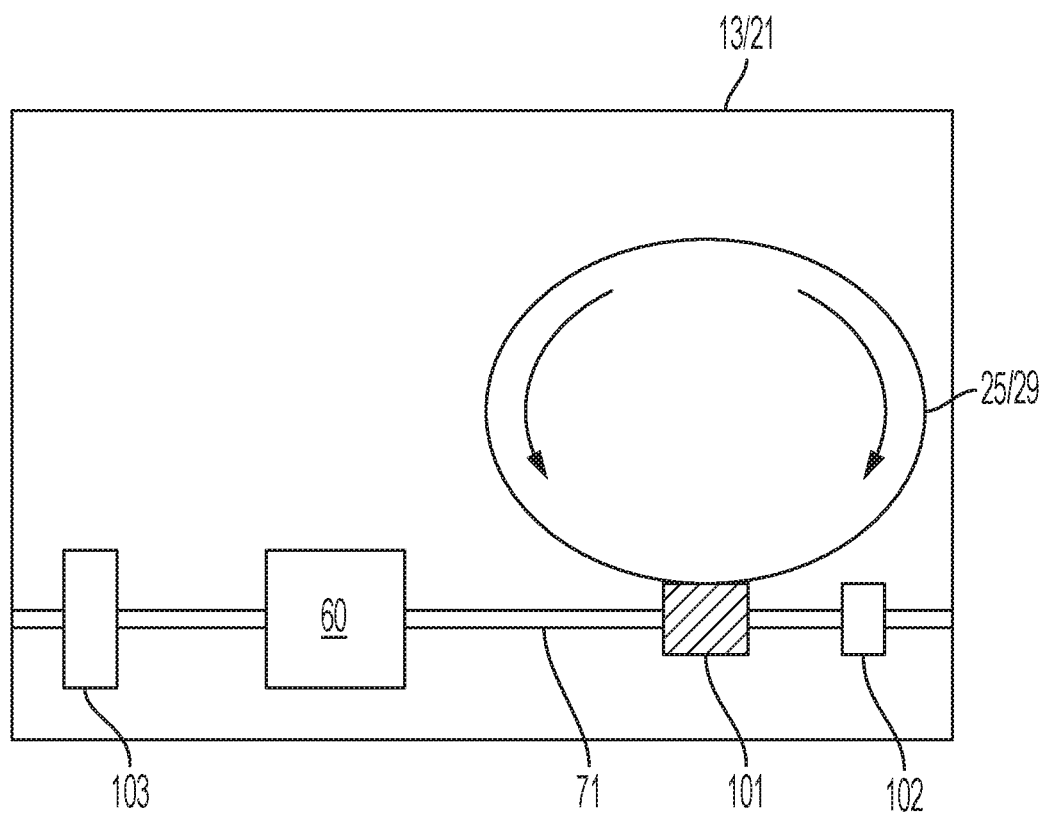
FIG. 8 is schematic view of an embodiment of a direct drive system for driving rotation of a laser beam.

In another embodiment, the motor 70 may simply directly drive a frictional element. For example, as shown in FIG. 8, the motor 60 may drive a frictional member 101 directly on the output shaft 71. The frictional member 101 may then directly engage a part to be rotated. That may include the rotating portion 25 or the damper 29. The motor 60 and related components would be held in either the laser level housing 13 if integral with the laser level, or the mount base 21 if part of the mount 20. A direct drive may also be accomplished by using gears instead of a frictional element. In either event, either the frictional member 101 or a suitable gear transfers motion from the axis of rotation of the motor 60 along the shaft 71 to rotate the rotating portion 25 of damper 29 selectively in the directions shown. If a frictional member 101 is used, it may not be necessary to include gearing on the rotation parts (25 or 29). Also, a frictional member 101 may be used instead of gearing in the other embodiments, as appropriate.

Figure 9:
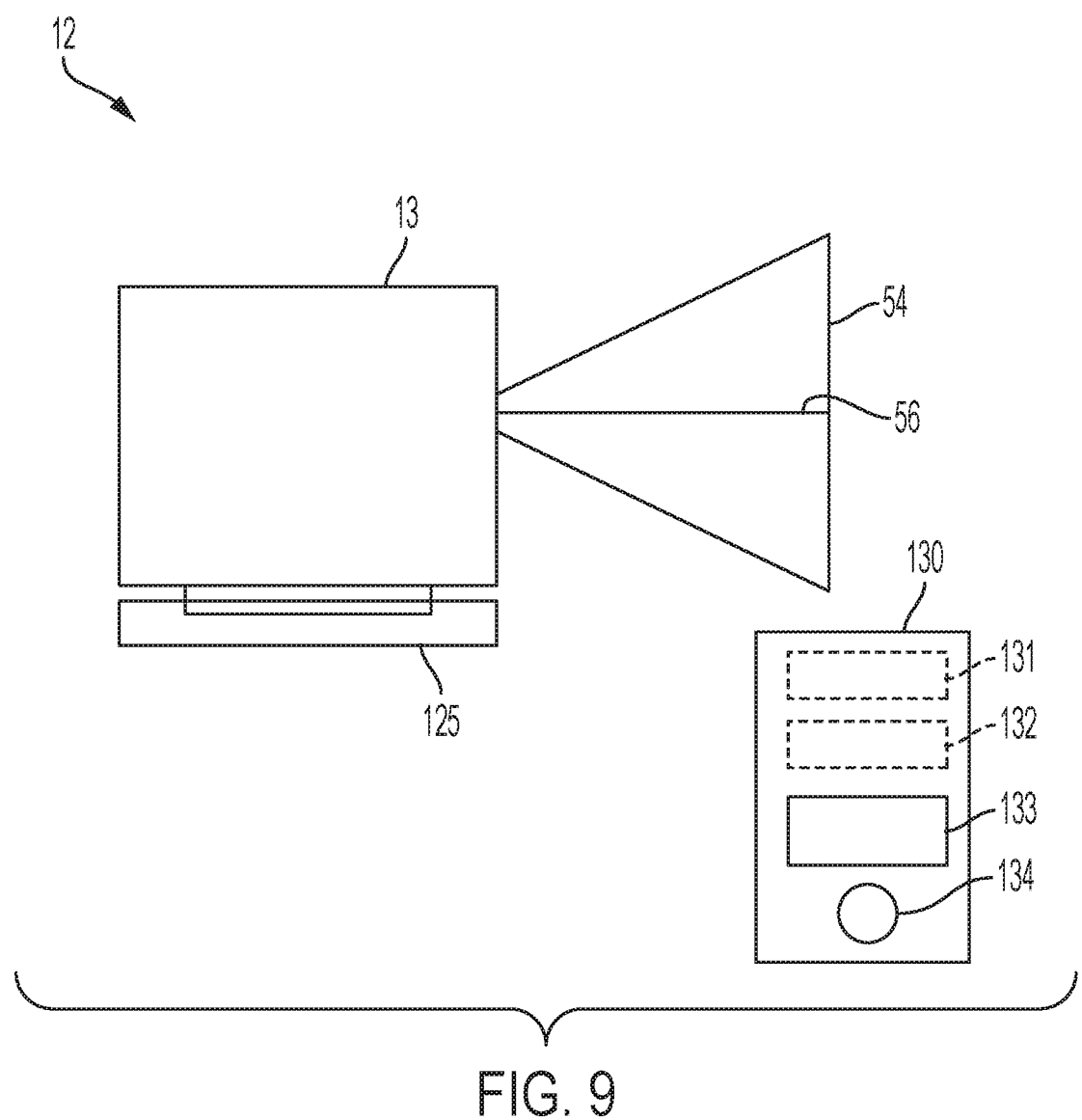
FIG. 9 is a side view of another exemplary embodiment in which the laser level includes a platform that houses the motor driving device for rotation of the laser level beam output.

In yet another exemplary embodiment, the laser level 12 may include a platform 125 which provides for rotation of the laser level 12. As shown in FIG. 9, the laser level 12 includes a platform 125. The platform has a rotating portion 126 between the platform 125 and housing 13. The rotating portion 126 operates similarly to the rotating portion 25 of the mount 20. Additionally, the platform 125 operates similarly to the base 21 of the mount and houses similar components, and operation of like components is the same unless otherwise discussed.

Figure 10:
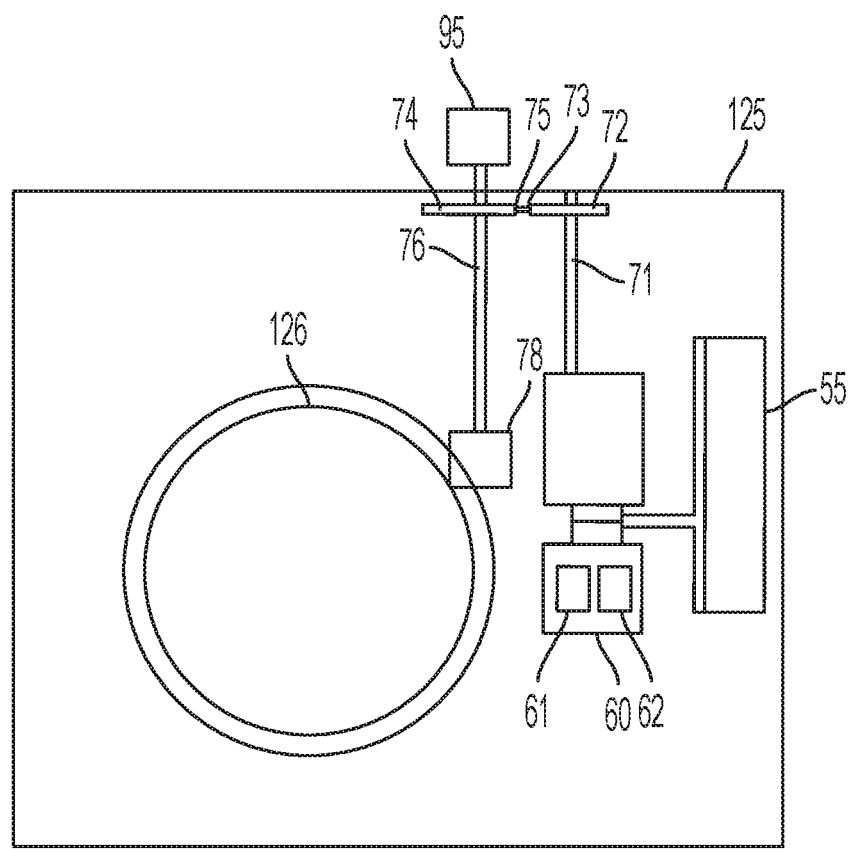
FIG. 10 is a view of the internals of the platform of the exemplary embodiment of FIG. 9 illustrating the motor driving device.

As shown in FIG. 10. The platform 125 has a similar configuration as the base 21 when it includes a motor 70 to rotate rotating portion 25. In this instance, motor 70 is configured to drive rotating portion 126 in a similar manner. Particularly, gear 78 may mesh with teeth 80 (not shown) of the rotating portion 126 to rotate the rotating portion, and thus the laser beams from the laser level 12. In this instance, the rotating portion 126 may be fixed to the laser level housing 13 and the platform 125.

As will be appreciated, various features of the embodiments may be combined or replaced with features from the other embodiments. In each of the embodiments, the remote input device 130 may be used to control rotation of the laser level 12 or a portion of the laser level.

Figure 11:
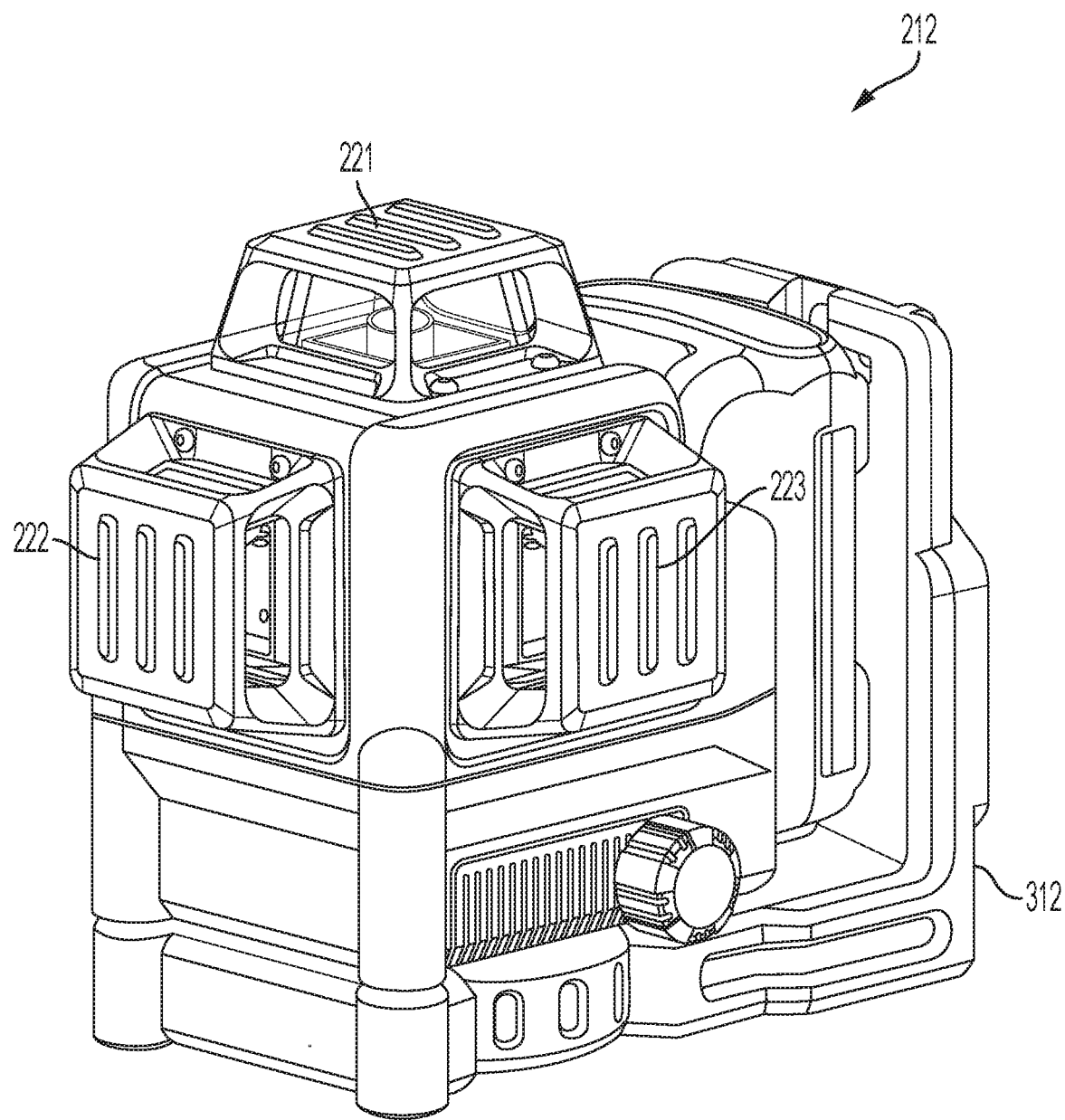
FIG. 11 is a perspective view of another exemplary embodiment of a laser level and mount.

FIG. 11 illustrates another exemplary embodiment of a laser level 212. Laser level 212 projects laser lines in three perpendicular planes from three projectors 221, 222 and 223 to create a three-line laser level. Projector 221 projects a horizontal beam and projectors 222 and 223 each project vertical beams. The laser level 212 is powered by a removable power tool battery pack 320. Three-line laser levels are known in the art, and laser level 212 is of the same type as that shown in U.S. Patent Application Publication No. 2018/0321035, which is hereby incorporated by reference in its entirety.

Figure 12:
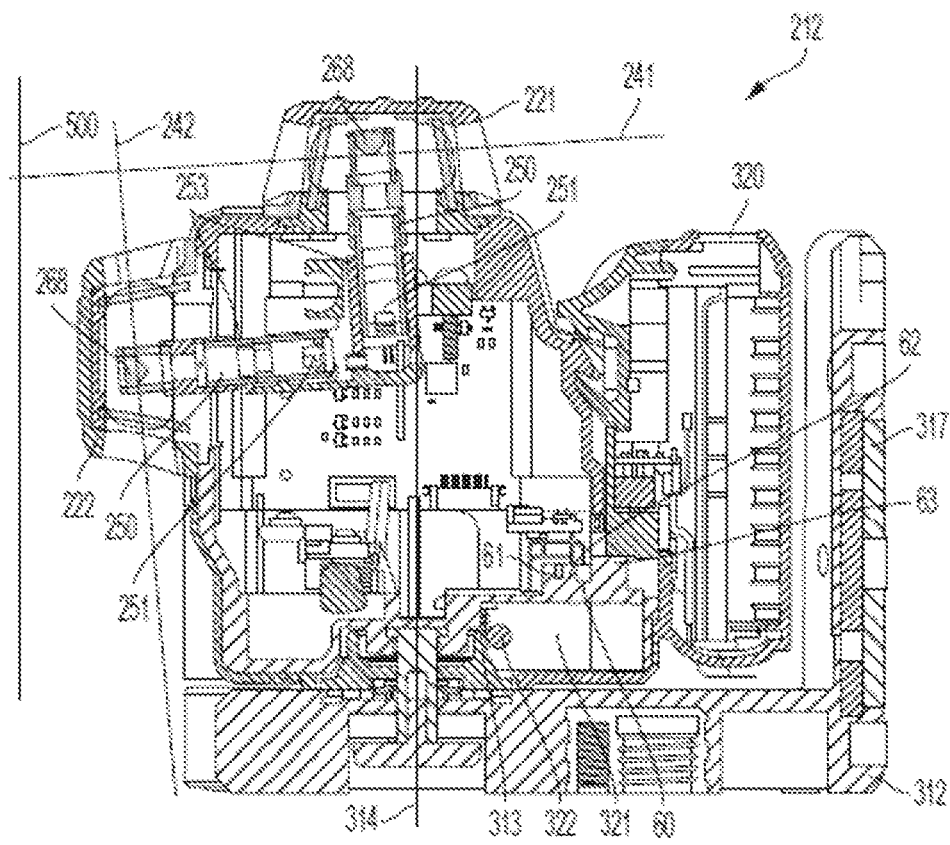
FIG. 12 is a side cut-away view of the exemplary embodiment of the laser level and mount.

FIG. 12 is a cut-away view of the laser level 212. The cutaway view shows laser modules 250 for the laser projectors 221 and 222. Each laser module includes a laser diode 251 that serves as a laser generating source. The laser diode 251 is held in a barrel 253 which is generally cylindrical in shape. The laser modules 250 also include cone member 268. Lasers projected by the laser diodes 251 hit the cone members 268 and are reflected into lines 241 and 242. Line 241 is a horizontal line and line 251 is a vertical line when the laser level 212 is placed on a horizontal surface, the laser modules 250 are properly calibrated and they are allowed to settle to their leveled position under gravity. In FIG. 12, the laser modules 250 are tilted such that they are mis-calibrated. Accordingly, line 241 is slightly off from horizontal and line 251 is slightly off from vertical.

Figure 14:
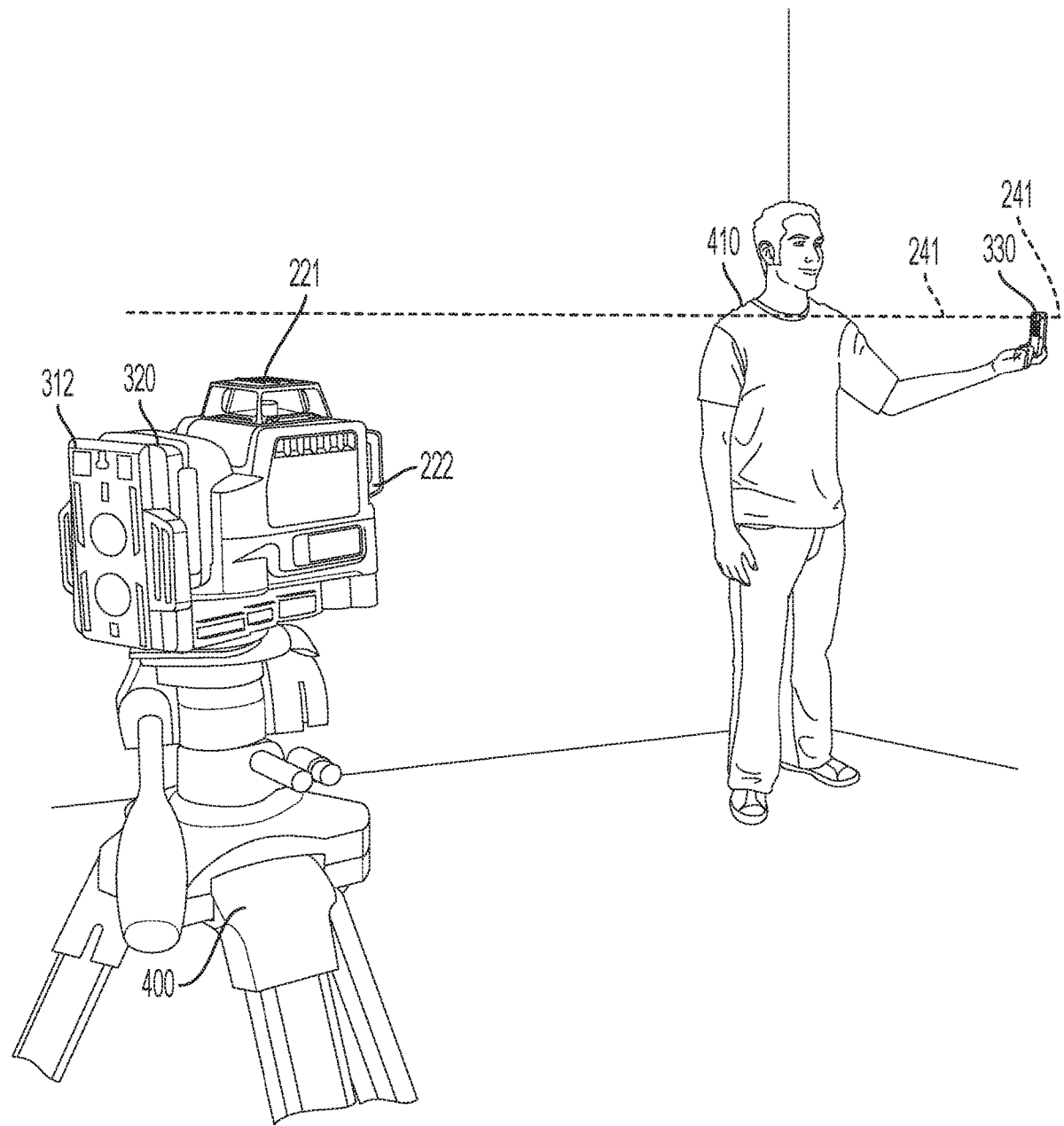
FIG. 14 is an exemplary embodiment of a laser level system including a detector for calibration.

The laser level 212 is connected to a base 312. It may be connected with a threaded fastener. The base 312 may itself be connected to a tripod 400, as is shown in FIG. 14. This may be done through threading the base 312 onto the tripod 400, one of the base 312 and the tripod 400 having a threaded projection and the other having a threaded hole for receiving a threaded projection.

Figure 13:
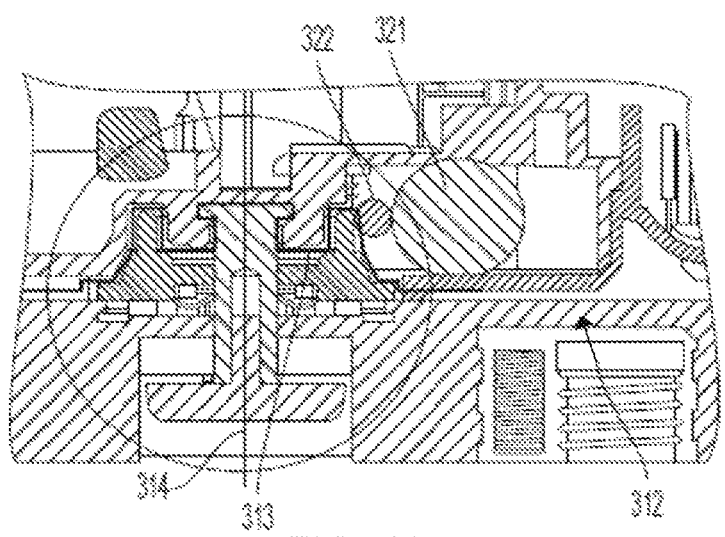
FIG. 13 is a close-up side cut-away view of a portion of the laser level and mount.

FIG. 13 is a close-up of a section of FIG. 12. As shown in FIGS. 12 and 13, the laser level 212 includes a motor 321. The motor 321 may also be powered by the battery pack 320. The motor is connected to and drives a fine adjust drive gear 322. The fine adjust drive gear 322 meshes with complementary gearing 313 on the base 312 such that when the motor drives the fine adjust drive gear 322, the laser level 212 moves relative to the base 312. In particular, the laser level 212 rotates about a rotational axis 314 at which it is connected to the base 312.

Rotation and other control of the laser level 212 may be performed by a remote input device, such as the remote input device 130 previously discussed. As with the other embodiments, the laser level 212 may have a transceiver configured to receive a signal from the remote input device and a controller 132 to control operation of the motor and laser diodes.

As mentioned above, the laser modules 250 in FIG. 12 are misaligned. The beam 241 is not truly horizontal and the beam 242 is not truly vertical. For example, the laser line 241 is lower towards a front of the laser level 212 (left side of FIG. 12; opposite the battery 320) and is higher in the rear. Accordingly, as the laser level 212 rotates, the line 241 projected onto a stationary wall moves up and down.

FIG. 12 includes a wall 500. The beam 241 will be lower on the wall 500 when in the position shown in FIG. 12, than when the laser level 212 is rotate 180 degrees such that the battery is in the front and the higher portion of the beam 241 hits the wall.

FIGS. 14-17 illustrate an exemplary embodiment in which a detector 330 serves as a remote input device and also provides a calibration feature for the laser level. The detector 330 has the functionality of the previously described remote input device 130 and the additional functionality described here. Additionally, while the detector 330 and calibration feature will be described with respect to laser level 212, it similarly could be implemented on the previously described laser levels and systems.

Figure 15:
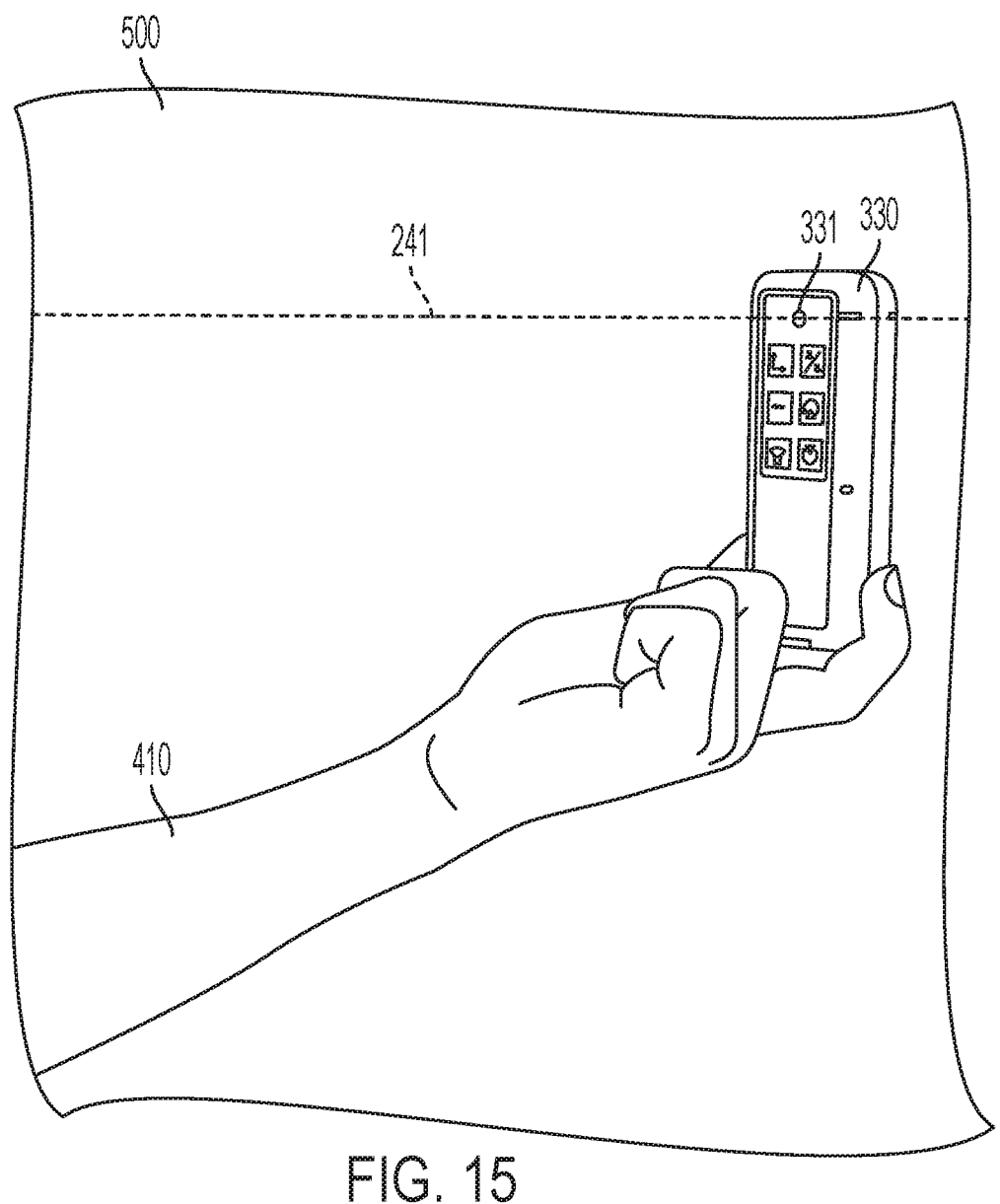
FIG. 15 is a view of the detector of the exemplary embodiment of the laser level system.

FIG. 14 illustrates a tripod 400. The base 312 is mounted to the tripod 400 and the laser level 212 is mounted on the base. As previously discussed, the projector 221 projects a line 241. When properly calibrated, and allowed to settle to a leveled position, the line 241 should be a horizontal beam or near horizontal beam. As shown in FIG. 14, a user 410 may hold a detector 330 against a wall 500. FIG. 15 illustrates a close-up view of the detector 330 on the wall 500. As shown, the detector 330 is held at the level of the line 241.

Figure 16:
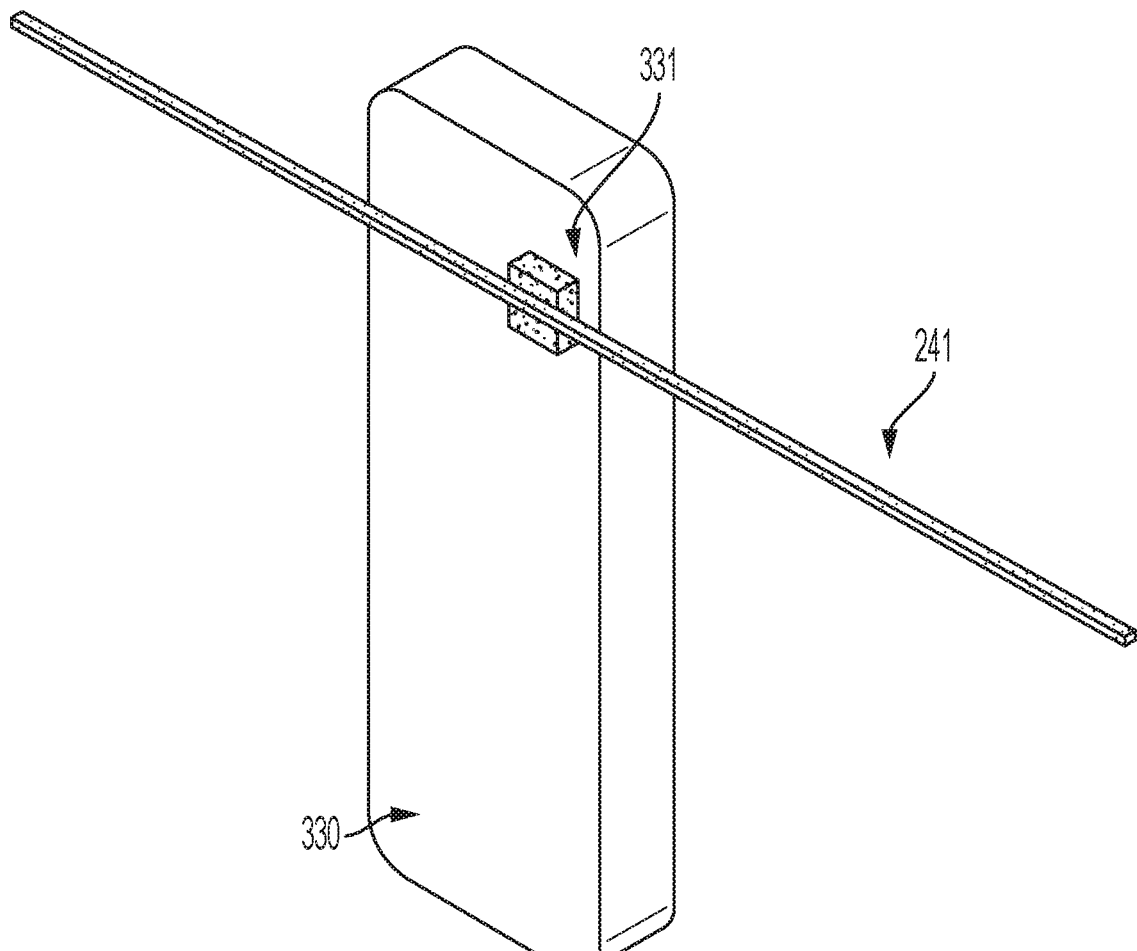
FIG. 16 is a perspective view of the detector of the exemplary embodiment of the laser level system.

FIG. 16 is an illustration of the detector 330. As shown in FIGS. 15 and 16, the detector has a window 331 for a photo-detector which can detect the presence of the laser line 241 or another laser output. The photo-detector may be a photo diode/avalanche photo diode. When the laser line 241 passes through the window 331, the photo-detector situated behind the detects the laser line 241. On the other hand, when the laser line 241 is outside of the window 331, the laser line does not pass through the window 331 to the photo-detector.

In a properly calibrated laser level 212, when the detector 330 is held stationary against the wall 500 such that the laser line 241 passes through the window 331, if the laser level 212 is rotated with respect to the base 312 (as discussed above), the laser line 241 will continue to pass through the window 331 and be detected by a photo-detector behind the window 331.

However, in a misaligned laser level 212, the laser line 241 will move vertically up and down with respect to the detector 330 and the window 331. Accordingly, if the laser line 241 is initially lined up with the window 331 so that it is detected by the photo-detector, when the laser level 212 rotates, the line 241 will move up or down with respect to the wall 500, detector 330 and window 331 that allows the laser through to the photo detector. If the line 241 moves sufficiently, then the laser line 241 will no longer overlap the window 331. In that instance, the laser line 241 will no longer pass through the window 331 and no longer be detected by the photo detector.

Figure 17:
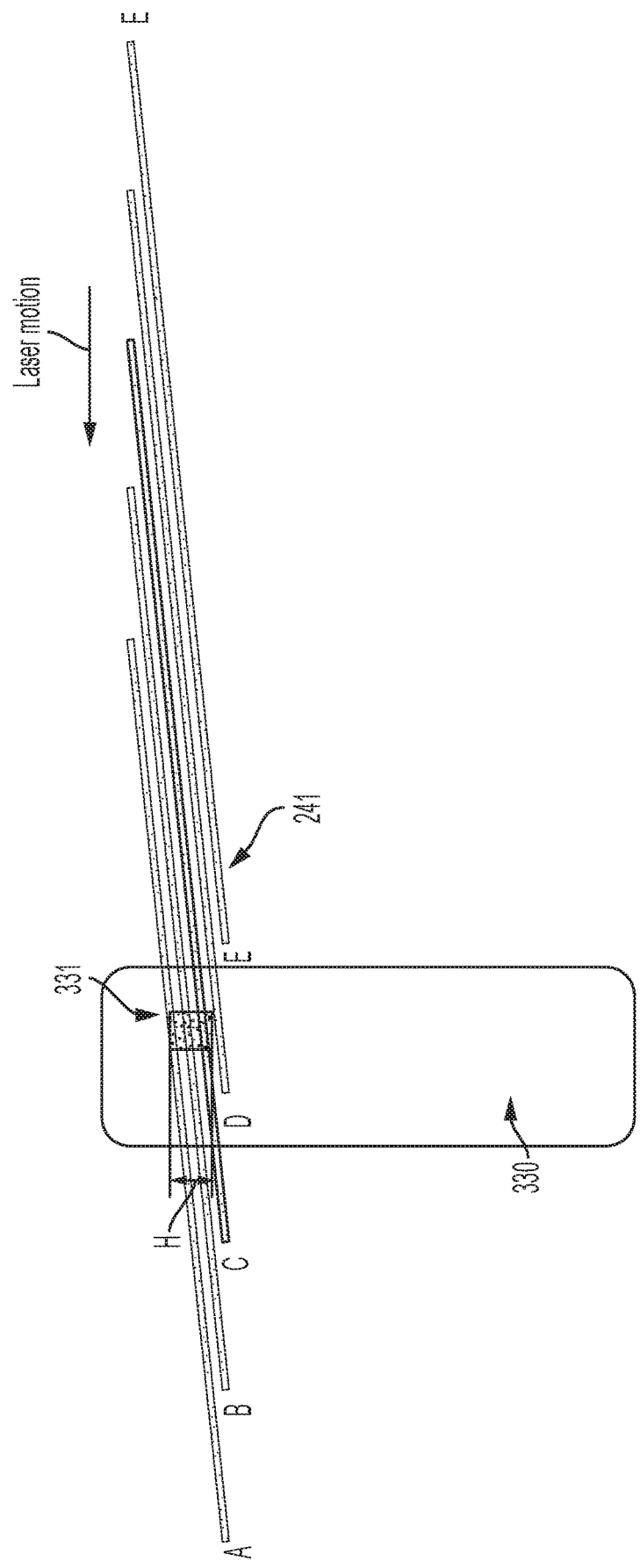
FIG. 17 is a front explanatory view of the detector of the exemplary embodiment of the laser level system.

FIG. 17 illustrates the laser line 241 in a variety of positions with respect to the detector 330. Particularly, it shows five positions of the laser line 241—A, B, C, D and E. As discussed, as the laser level 212 rotates, the position of the laser line 241 may change in the event that the laser level 212 is misaligned or otherwise malfunctioning. As shown in FIG. 17, when the laser line 241 is at a position A, the line passes partially through the window 331. Accordingly, the laser line 241 can be picked up by the photo diode. When at positions B and C, the laser line 241 passes clearly through the window. Therefore, the line 241 passes through the window 331 and can be detected by the photo detector. When the laser line 241 is in the positions D and E, the line 241 passes below the window 331. Accordingly, the laser line 241 does not pass through the window 331, does not reach the photo detector and is therefore not detected by the photo detector. This allows a user 410 to determine if the laser level 212 is adequately calibrated.

In order to determine whether the laser level 212 is adequately calibrated, the user 410 places the detector 330 on the wall 500 with the line 241 passing through a center of the window 331. The center of the window 331 may be identified by markings 335 on the detector 330.

Once the line 241 is aligned with the markings 335 identifying the center of the window 331, the user 410 or another worker may instruct the laser level 212 to rotate around one time (360 degrees). This may be done through the detector 330 which serves as a remote control, or by using controls on the laser level 212 (or the bracket 312 or tripod 400, if applicable). If the laser level 212 is well aligned, the line 241 will pass through the window 331 through the entire 360 degree rotation of the laser level 212. In this instance, the photo detector will continuously detect the laser line 241 and a controller of the detector 330 can determine that the laser level 212 is properly aligned because the line 241 does not move significantly up or down vertically through the rotation. The detector 330 can then inform a user that the laser level 212 is properly aligned. The detector 330 can have a display or indicator that indicates that the laser level 212 is properly aligned. The indicator may be a simple LED light that is activated when the laser level 212 is properly aligned. The display may also be a more elaborate display such as an LCD or other screen that displays text or other graphics indicating proper alignment. A similar display or indicator may additionally or alternatively be placed on the laser level 212 or the base 312.

In the event that the laser level 212 is misaligned, while the line 241 initially starts off projecting through the window 331, the line 241 will deviate from that position as the laser level 212 is rotated. For example, with reference to FIG. 17, the detector 330 may be initially positioned such that the laser line 241 is at a location B. At location B, the laser line 241 overlaps with the window 331 and is detected by a photo-detector. Then, as the laser level 212 rotates, the laser line 241 may move to the positions D or E. When the laser line 241 moves to the D or E positions, the laser line 241 no longer shines through the window 331 and is no longer detected by the photo detector behind the window 331. Accordingly, the laser line 241 is no longer detected, and the controller of the detector 330 can determine that the laser level is misaligned due to the vertical drifting of the laser line 241. Similar to when the laser level 212 is properly aligned, the detector 330 can have a display or indicator that indicates that the laser level 212 is not properly aligned (i.e., misaligned). The indicator may be a simple LED light that is activated when the laser level 212 is misaligned. The display may also be a more elaborate display such as an LCD or other screen that displays text or other graphics indicating proper alignment. A similar display or indicator may additionally or alternatively be placed on the laser level 212 or the base 312.

In the present exemplary embodiment, there is a single window 331 with a single photo detector behind the window 331. The user 410 initially lines up the line 241 with a center of the window 331, perhaps with the help of a marking 335 located at the center of the window 331.

In other embodiments, there may be multiple photo-detectors behind the window, including a central photo detector, and the detector 330 may indicate when the line 241 is lined up on the central photo-detector. For example, there may be three photo-detectors vertically aligned and the detector 330 may indicate when the laser line 241 is lined up with the central photo detector. In that event, there may be in some embodiments one window, more than one window or dividers to prevent leakage of the signal to multiple photo detectors.

In the present exemplary embodiment, the height H of the window 331 may be adjusted in order to adjust the sensitivity of the calibration. If the laser line 241 is initially located at a center of the window 331, movement of roughly half the height H of the window will indicate that the laser level 212 is misaligned. That is, if the laser line 241 initially shines through the window 331 at the center marking 335 and the window 331 has a height of H moving roughly ½ H either up or down will cause the laser line to be outside of the window 331. Accordingly, the height H of the window helps to determine the sensitivity. If the height H is approximately ¼ inch, movement of greater than ⅛ inch will produce a misalignment reading. If the height H is approximately ½ inch, it will take a movement of approximately ¼ inch or greater to produce a misalignment reading. The window 331 of the present exemplary embodiment have a height of ¼ inch or less; ⅜ inch or less; ½ inch or less; ⅝ inch or less; ¾ inch or less; ⅞ inch or less; or 1 inch or less.

Additionally, the distance between the laser level 212 and the wall 500 may affect the calibration. Accordingly, instructions may provide the user with a reference distance. For example, an instruction manual may indicate that the user should place a front surface of the laser level 212 ten feet away from the wall 500. The user could also be instructed to change the distance depending upon a desired sensitivity. That is, the user could place the laser level 212 closer to the wall 500 and detector 330 if a lower sensitivity is desired (more often considered aligned) and farther away from the wall 500 if a higher sensitivity is desired (more often determined as misaligned).

Figure 18:
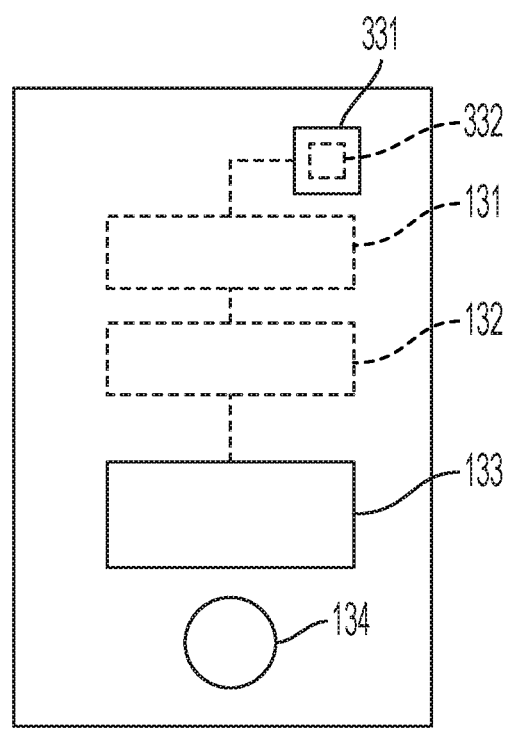
FIG. 18 is an explanatory schematic view of the detector of the exemplary embodiment of the laser level system.

FIG. 18 illustrates a schematic view of the detector 330. As shown in the schematic, the detector 330 includes the same components as remote input device 130 and additionally includes the window 331 and a photo detector 332 behind the window 331.

As stated above, the calibration feature may be included and or combined with the other embodiments described herein.

The laser level 212 may also include an accelerometer 63. The accelerometer 63 is functionally connected to a controller such as a microcontroller 61. The accelerometer 63 in the laser level 212 may in addition to the functionality described above, determine if the laser level 212 is placed on a surface or tripod in a way that the laser level 212 horizontal. That is, if the laser level 212 is placed on a flat horizontal surface, or the mount 312 is placed on a flat horizontal surface, the line 241 should be horizontal or nearly horizontal if properly calibrated. The surface and positioning of the laser level 212 does not need to be precisely horizontal, as the laser modules 250 are on a self-leveling pendulum mount that provides some degree of movement. This pendulum mount allows the modules 250 to correctly position under gravity for about 10 degrees. Outside of this range, the modules 250 are unable to self level. Accordingly, the accelerometer 63 can determine whether the laser level 212 is outside of the self-leveling range and convey this information to the detector 330. The detector 330 can then display or alert the user 410 that the laser level 212 is outside of the self-leveling range. This can be done through an indicator or other display. When the laser level 212 is outside of the self-leveling range, the line 241 will generally not be horizontal regardless of the calibration and a detection of alignment cannot be performed.

Although the present technology has been described in detail for the purpose of illustration based on what is currently considered to be the most practical and preferred embodiments, it is to be understood that such detail is solely for that purpose and that the technology is not limited to the disclosed embodiments, but, on the contrary, is intended to cover modifications and equivalent arrangements that are within the spirit and scope of the appended claims. For example, it is to be understood that the present technology contemplates that, to the extent possible, one or more features of any embodiment can be combined with one or more features of any other embodiment.

What is claimed is:

1. A method of determining alignment of a laser level system, the method comprising:
    mounting a laser level on a mount;
    projecting a laser line from the laser level;
    detecting the laser line with a remote detector;
    rotating the laser level relative to the mount while keeping the remote detector stationary;
    determining whether the laser line moves relative to the remote detector as the laser level rotates.

2. The method of claim 1, further comprising indicating that the laser line has moved relative to the remote detector more than a threshold amount.

3. The method of claim 1, wherein the laser line is a substantially horizontal laser line.

4. The method of claim 3, determining whether the laser line moves relative to the remote detector as the laser level rotates comprises determining whether the laser line moves vertically relative to the remote detector.

5. The method of claim 1, wherein the remote detector comprises a photo diode.

6. The method of claim 5, wherein the remote detector comprises a window which allows the laser line to project onto the photo diode when the laser line is aligned with the window.

7. The method of claim 1, wherein the remote detector further serves as a remote control device which is configured to control at least one operation of the laser level or the mount.

8. The method of claim 7, wherein the remote detector is configured to control rotation of the laser level relative to the mount.

9. The method of claim 8, wherein the remote detector includes a display.

10. The method of claim 7, wherein the remote detector includes a controller and a transceiver.

11. The laser level system of claim 1, wherein the laser level is a cross-line laser level.

12. A method of determining alignment of a laser level, the method comprising:

projecting a substantially horizontal laser line from the laser level;

detecting the laser line with a remote detector;

rotating the laser line while keeping the remote detector stationary; and determining a change in a vertical positioning of the laser line relative to the remote detector as the laser line rotates;

wherein the remote detector comprises a sensor;

wherein the remote detector comprises a window which allows the laser line to project onto the sensor when the laser line is aligned with the window; and wherein the remote detector determines the change in vertical positioning based on the laser line moving from a position where the laser line passes through the window to project onto the sensor to a position where the laser line does not pass through the window as the laser line is rotated.

13. The method of claim 12, the remote detector further serves as a remote control device which is configured to control at least one operation of the laser level or the mount.

14. The method of claim 13, the remote detector is configured to control rotation of the laser level relative to the mount.

15. The method of claim 14, the remote detector includes a controller.

16. A laser level system, comprising:

a mount;

a cross-line laser level rotatably secured to the mount, the cross-line laser level configured to project a horizontal laser line and a vertical laser line;

a remote detector;

wherein the remote detector includes a sensor configured to detect the laser line; and wherein the remote detector is configured to determine a misalignment of the horizontal laser line.

17. The laser level system of claim 16, wherein the remote detector is configured to control rotation of the cross-line laser level relative to the mount.

18. The laser level system of claim 17, wherein the cross line laser level includes a controller and a transceiver.

19. The laser level system of claim 16, wherein the sensor comprises a photo-diode.

20. The laser level system of claim 16, wherein the mount comprises a base portion and an attachment portion generally transverse to the base portion;

wherein the mount further comprises at least one magnet configured to secure the mount to a surface.

* * * * *